US006802111B1

(12) United States Patent
Dion et al.

(10) Patent No.: US 6,802,111 B1
(45) Date of Patent: Oct. 12, 2004

(54) TOOL FOR PRODUCING CAMSHAFTS BY EXPANDING

(75) Inventors: Alain Dion, Guyancourt (FR); Olivier Darlix, Saint Cloud (FR); Gerard Montaz, Pouilley les Vignes (FR); Benoit Daragon, Pouilley les Vignes (FR)

(73) Assignees: Renault, Boulogne Billancourt (FR); Fabricom Systemes d'Assemblage, Besancon (FR)

( * ) Notice: Subject to any disclaimer, the term of this patent is extended or adjusted under 35 U.S.C. 154(b) by 316 days.

(21) Appl. No.: 10/049,643

(22) PCT Filed: Aug. 4, 2000

(86) PCT No.: PCT/FR00/02247

§ 371 (c)(1),
(2), (4) Date: Jun. 19, 2002

(87) PCT Pub. No.: WO01/14097

PCT Pub. Date: Mar. 1, 2001

(30) Foreign Application Priority Data

Aug. 24, 1999 (FR) .......................................... 99 10731

(51) Int. Cl.[7] ........................ B25B 27/14; B21D 53/84; B21D 39/00; B23P 17/00; F16H 53/00

(52) U.S. Cl. ....................... 29/281.5; 29/88.1; 29/421.1; 29/467; 29/522.1; 29/523; 74/567

(58) Field of Search ............................... 29/281.5, 283, 29/421, 421.2, 445, 467, 507, 522.1, 532, 888.1; 74/567; 72/58

(56) References Cited

U.S. PATENT DOCUMENTS

| | | | | |
|---|---|---|---|---|
| 4,827,585 A | * | 5/1989 | Nakamura | .................. 29/888.1 |
| 4,835,832 A | * | 6/1989 | Arnold et al. | .............. 29/888.1 |
| 5,054,182 A | | 10/1991 | Frielingsdorf et al. | |
| 5,220,727 A | * | 6/1993 | Hochstein | .................. 29/888.1 |

FOREIGN PATENT DOCUMENTS

| | | |
|---|---|---|
| EP | 0 278 676 | 8/1988 |
| EP | 0 389 070 | 9/1990 |
| EP | 0 592 068 | 4/1994 |

* cited by examiner

*Primary Examiner*—John C. Hong
(74) *Attorney, Agent, or Firm*—Oblon, Spivak, McClelland, Maier & Neustadt, P.C.

(57) ABSTRACT

A tool for producing expanded camshafts. The tool includes at least one modular die made up of segments that are joined together and that are provided with opposing slides for centering and aligning the cams around the axis of the shafts.

17 Claims, 10 Drawing Sheets

TOOL FOR PRODUCING CAMSHAFTS BY EXPANDING

The present invention relates to the production of camshafts, especially for reciprocating-piston internal combustion engines. More particularly, it relates to a device for holding in orientation, around a tubular shaft, a flat cam of ovoid contour perforated by an orifice through which the said shaft passes, in view of fixation of the cam on the shaft by expanding the said shaft, as well as to a die equipped with a plurality of these devices and to a machine for production of camshafts provided with at least one such die.

From U.S. Pat. Nos. 4,781,076 and 4,858,295, for example, there is already known a process for production of such a camshaft by expanding, wherein the said cams are disposed along a tubular shaft passing through them, after which the said shaft is expanded radially with plastic deformation by forcing an expander tool into the interior thereof in order to fix the said cams on the said shaft. To ensure such fixations, the orifice of the said cams is provided with irregularities of contour, into the hollows of which the peripheral material of the radially expanded shaft penetrates.

The object of the present invention is to provide an advantageous tool for application of such a process.

To this end, the invention relates very particularly to a device for holding in orientation, around a reference axis, a flat cam with ovoid peripheral contour perforated by an orifice through which there can be passed a tubular shaft whose axis then coincides with the said reference axis, in view of fixation of the said cam on the said shaft by expanding this shaft, this device being noteworthy in that it is provided with:

a body provided with a transverse passage for the said shaft and with a conduit for introduction of the said cam, the said introduction conduit opening at one end into the said transverse passage and at the other end at the periphery of the said body;

means for holding the said cam in its introduction conduit in a waiting position in which its orifice is at least approximately coaxial with the said transverse passage;

two first sliding blocks, spaced apart and parallel, interlockingly mounted to move translationally in the said body in a manner that is at least substantially orthogonal to the said transverse passage for the said shaft, the said first sliding blocks being elastically spread apart from the said transverse passage by first elastic means, with their external ends projecting outside the said body on one side thereof and their internal ends disposed facing a part of the ovoid contour of the said cam when this is in the said waiting position;

two second sliding blocks, spaced apart and parallel, in mirror-image relationship to the said first sliding blocks and interlockingly mounted to move translationally in the said body, in a manner that is at least substantially orthogonal to the said transverse passage for the said shaft, the said second sliding blocks being elastically spread apart from the said transverse passage by second elastic means, with their external ends projecting outside the said body on the other side thereof, and their internal ends disposed facing another part of the ovoid contour of the said cam when this is in the said waiting position; and a mechanical linkage connecting the said first and second sliding blocks such that, when the said first sliding blocks are pressed against the action of the said first elastic means to displace the internal ends of the said first sliding blocks toward the said part of the ovoid contour of the said cam until contact is made therewith, the said second sliding blocks are pressed by the said mechanical linkage against the action of the said second elastic means to displace the internal ends of the said second sliding blocks toward the said other part of the ovoid contour of the said cam until contact is made therewith.

Thus, in the device of the invention, each cam, starting from its waiting position, is pressed in opposing directions by the said first and second sliding blocks, which permits it to be displaced and to turn around its axis so that on the one hand it eliminates the error of its angular position due to the imprecision of introduction into the said conduit by, for example, a robot, and on the other hand it compensates for the errors of precision in production of the said cam. It is therefore easily understood that the said cam is then centered and oriented precisely, regardless of the precision of its production and of how it is oriented relative to the introduction conduit.

Consequently, for a given cam contour and a given angular orientation of the cam, the relative lengths of the said first and second sliding blocks are themselves determined. To be able to adjust these relative lengths and therefore the centering and orientation of each cam, it is advantageous for the said first and second sliding blocks to be adjustable in length. For this purpose they can be provided with a portion of fixed length and a portion of adjustable length comprised, for example, by a set of interchangeable shims of different lengths, with which the angular position of the cam can be adjusted. In addition, to improve the centering and orientation of the cam still further, it is advantageous for the spacing between the said first sliding blocks and the spacing between the said second sliding blocks to be determined as a function of the contour of the cam and of the angular orientation thereof around the said shaft. These spacings are chosen so as to ensure the largest possible lever arm on each sliding block, in order to facilitate orientation while ensuring firm engagement of the said cam by the said first and second sliding blocks in the said waiting position.

In order to facilitate the contact between the contour of the cam on the one hand and the internal ends of the said first and second sliding blocks on the other hand, these sliding blocks are provided with rolling members such as wheels that can roll over the said ovoid peripheral contour.

Advantageously the said means for holding the said cam in waiting position in its introduction conduit comprise a pressing pad pressed elastically toward a position-reference plate interlocked with the said device, the said pressing pad being spread apart elastically from this reference plate during introduction of the said cam flatly between the said pressing pad and the said reference plate. It is seen that the said cam is in this way held by friction while being pressed between the said pressing pad and the said reference plate, and the position of the cam along the said tubular shaft is easily adjustable by disposing thickness shims in front of or behind the said reference plate. Preferably the said means for holding the cam are provided with a stop system against which the said pressing pad is pressed elastically when no cam is in waiting position, this stop system imposing, between the said pressing pad and the said reference plate, a minimum spacing smaller than the thickness of the said cam. In this case in particular, the said pressing pad can be provided with a chamfer on which the said cam, during its displacement toward its waiting position in the said introduction conduit, exerts a pressure that causes the said pressing pad to be spread apart elastically relative to the said reference plate.

In a particularly advantageous embodiment of the device according to the present invention, the said holding means form a mechanical unit inserted and fixed in the said introduction circuit. Thus there can be provided a plurality of different units, each specifically adapted to a particular cam and interchangeable with the other units. Thus the said device can be used for cams of different dimensions and shapes.

To ensure that it can be easily assembled in compact manner with other similar devices, the body of the said device according to the present invention advantageously has the form of a thick plate with parallel faces. For purposes of greater compactness of an assembly of a plurality of such devices, the slideways for the said first and second sliding blocks can be machined in a first of the said parallel faces of the said plate, while the said introduction conduit is machined only partly in this same first face, the second face of the said plate being machined to form partly the introduction conduit of another plate, whose first face can be applied against the said second face of the said plate.

Thus the present invention also relates to a die for production, by expanding, of a tubular camshaft, especially for an internal combustion engine, the said cams being distributed along the said shaft with specific orientations, the said die being provided with as many devices similar to that described as the said shaft has cams, the said devices being assembled one after another in such a way that their transverse passages are aligned to form a channel for the said tubular shaft and in such a way that their cam-introduction conduits are disposed respectively at the position of a cam along the said shaft. In order to ensure that such a die constituted by a succession of such devices having a body in the form of a thick plate corresponds correctly to the positions to be occupied by the said cams along the said shaft, it is possible:

either to determine the thickness of the thick plate constituting the body of each device as a function of the said positions;

or to produce all of the said devices with thick plates of identical thickness and to provide thickness shims designed to be disposed between the said devices.

Such a die can be mounted alone or with at least one identical die on a machine for the production of camshafts by expanding provided with a single actuating member which commonly presses all of the said first sliding blocks of the said die, the actuating member being mounted on the said machine independently of the said die. Thus the control member of the die is interlocked with the machine and not with the die, such that the die can be easily mounted and demounted on the machine, in order, for example, to be replaced by another. It will be noted that such mounting and demounting operations are facilitated by the fact that the die, constituted by a plate assembly, is compact. It is therefore easy to maneuver and can be automatically mounted and demounted on the machine.

To improve the compactness and ease of mounting and demounting of the die even more, it is additionally provided that the stop designed to block one end of the tubular shaft during expansion thereof is also mounted on the said machine—and not on the die—independently of the said die, facing the said channel for the said tubular shaft.

Preferably the machine according to the present invention is equipped with at least two such dies, each able to move from at least one cam-loading station to at least one expanding station then, after discharge of the expanded camshaft, from the said expanding station to the said loading station.

It is therefore seen that, by virtue of the present invention, the expanding machine has numerous advantages:

because it uses cam centering and orienting devices independent from one another and specific to each cam, it has great modularity;

since engagement of each cam by the sliding blocks is symmetric, the precision of centering and orientation of each cam is high regardless of the precision of introduction and production of the said cams;

compactness is ensured by the constitution of the die by devices in the form of plates applied one against the other and assembled together;

interchangeability of the die is easy, since it is compact and does not carry either the expander stop or the sliding-block control member;

adjustments of axial and angular position of the cams can be achieved easily by shims as described hereinabove;

flexibility of the die is high, because it can be used for expanding camshafts of different types using a majority of standard elements and a minimum of elements specific to a particular type of camshaft.

It will be clearly understood how the invention can be achieved by consulting the figures of the attached drawing. On these figures, like references denote like elements.

Figure 1:
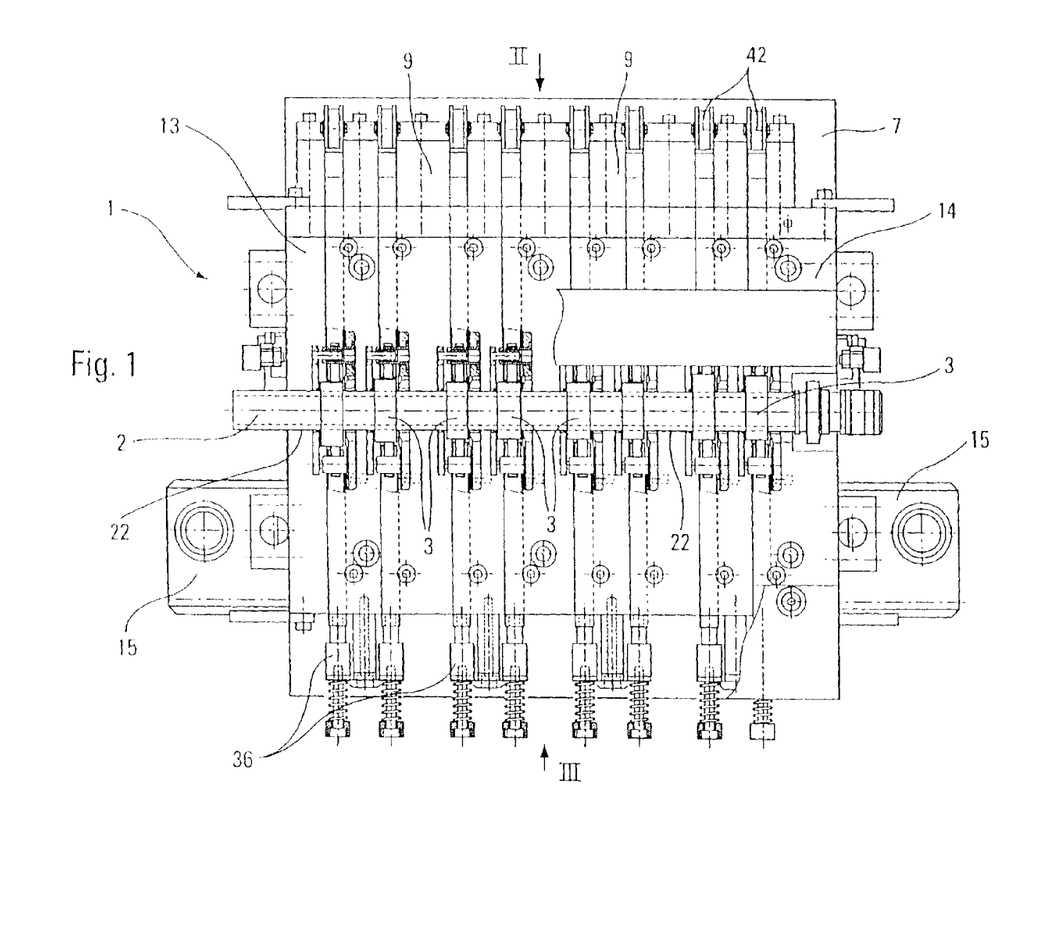
FIG. 1 is an overhead view of an expander die according to the present invention, designed for production of a tubular camshaft.
Figure 2:
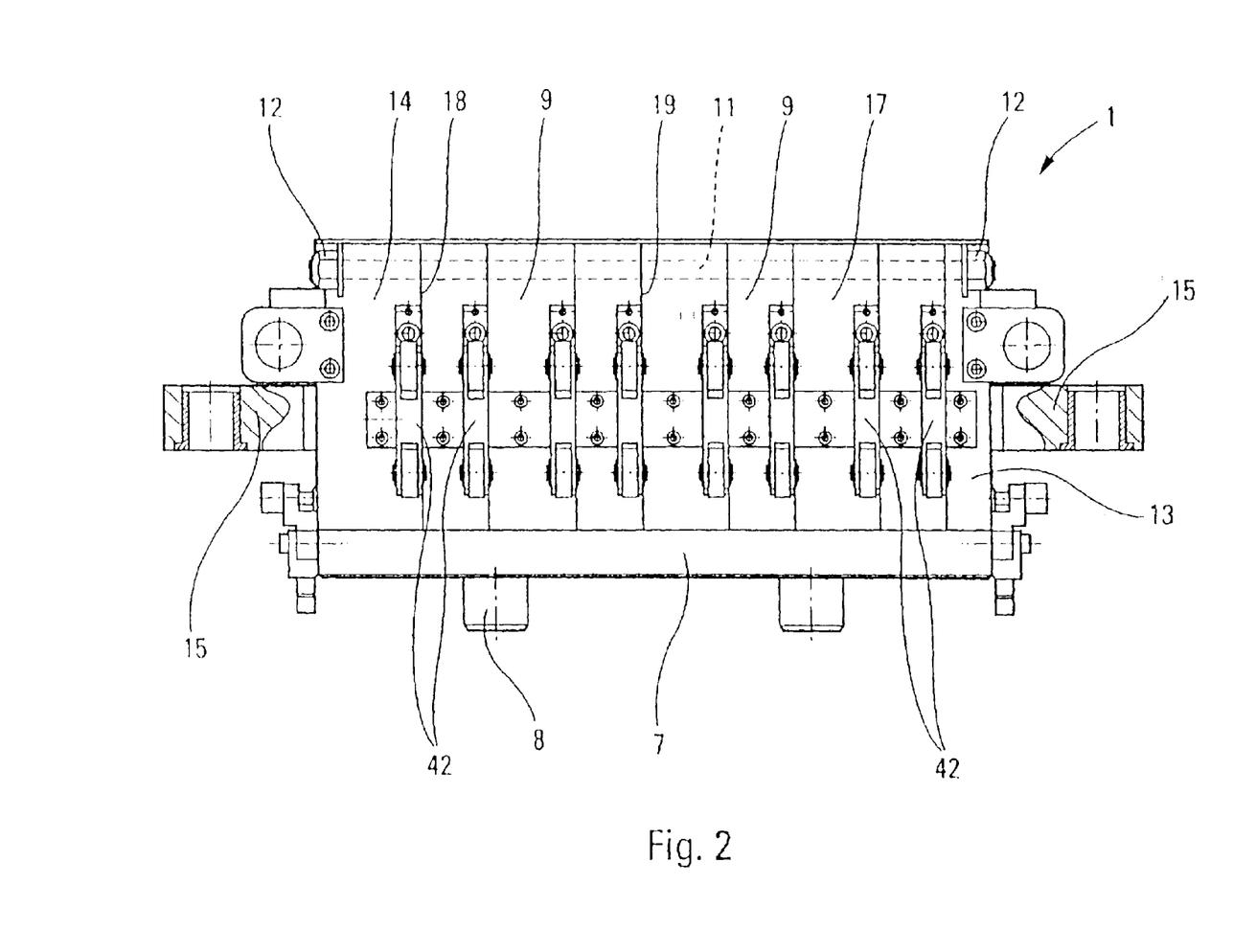
FIGS. 2 and 3 are side views of the expander die of FIG. 1 along arrows II and III respectively of the latter figure.
Figure 3:
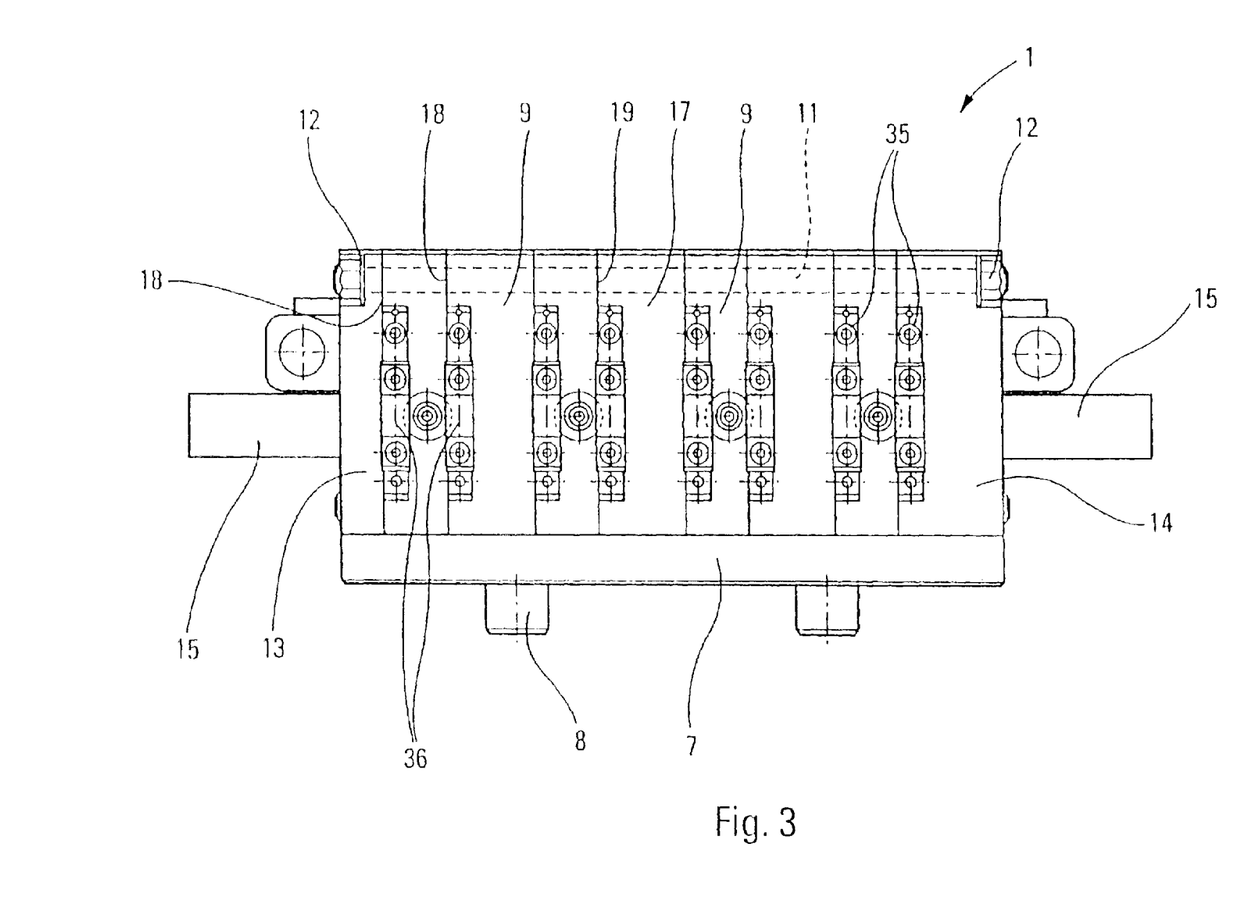
Figure 4:
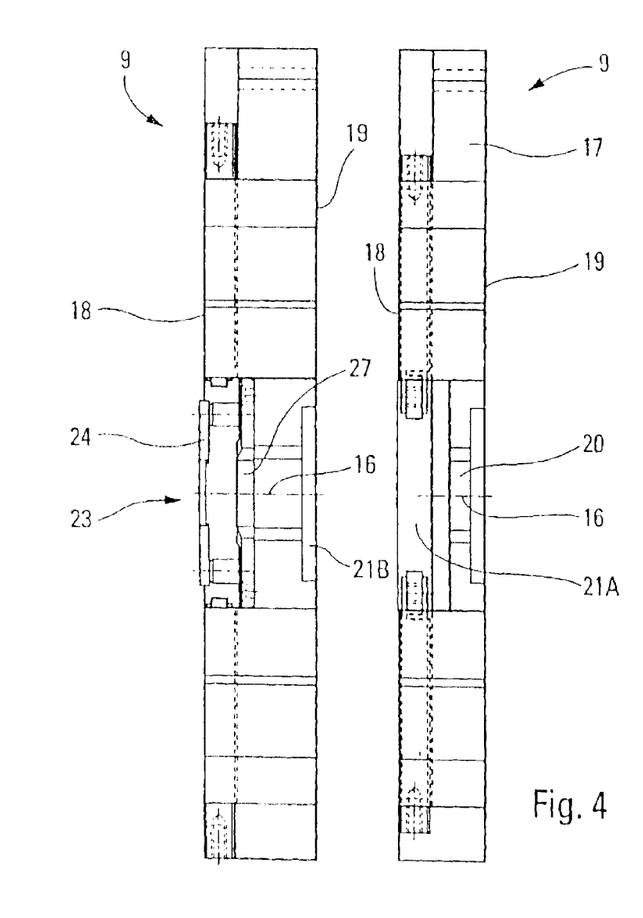
FIG. 4 shows in an overhead view two segments of the die of FIGS. 1 to 3, the thickest of these segments being provided with a cam-holding unit and having its sliding blocks in spread-apart position, while the least thick segment is illustrated without cam-holding units and with its sliding blocks in proximate position.

Expander die 1 illustrated in FIGS. 1 to 3 is intended for production of a camshaft for an internal combustion engine, constituted from a tubular shaft 2 and a plurality of cams 3 distributed along tubular shaft 2. As is evident from FIGS. 10 and 16, each cam 3 is flat and has an ovoid peripheral contour 4. In addition, it is perforated by a cylindrical orifice 5 provided with surface irregularities 6. In FIG. 1, die 1 is illustrated in a position for which all cams 3 are held with precise centering and correct specific orientations and are traversed by tubular shaft 2. In this position, tubular shaft 2 is ready to be expanded to ensure that its external cylindrical wall, expanded plastically by an expander, is forced to fill orifices 5 and irregularities 6, in order to interlock all said cams 3 with the said tubular shaft 2.

Figure 16:
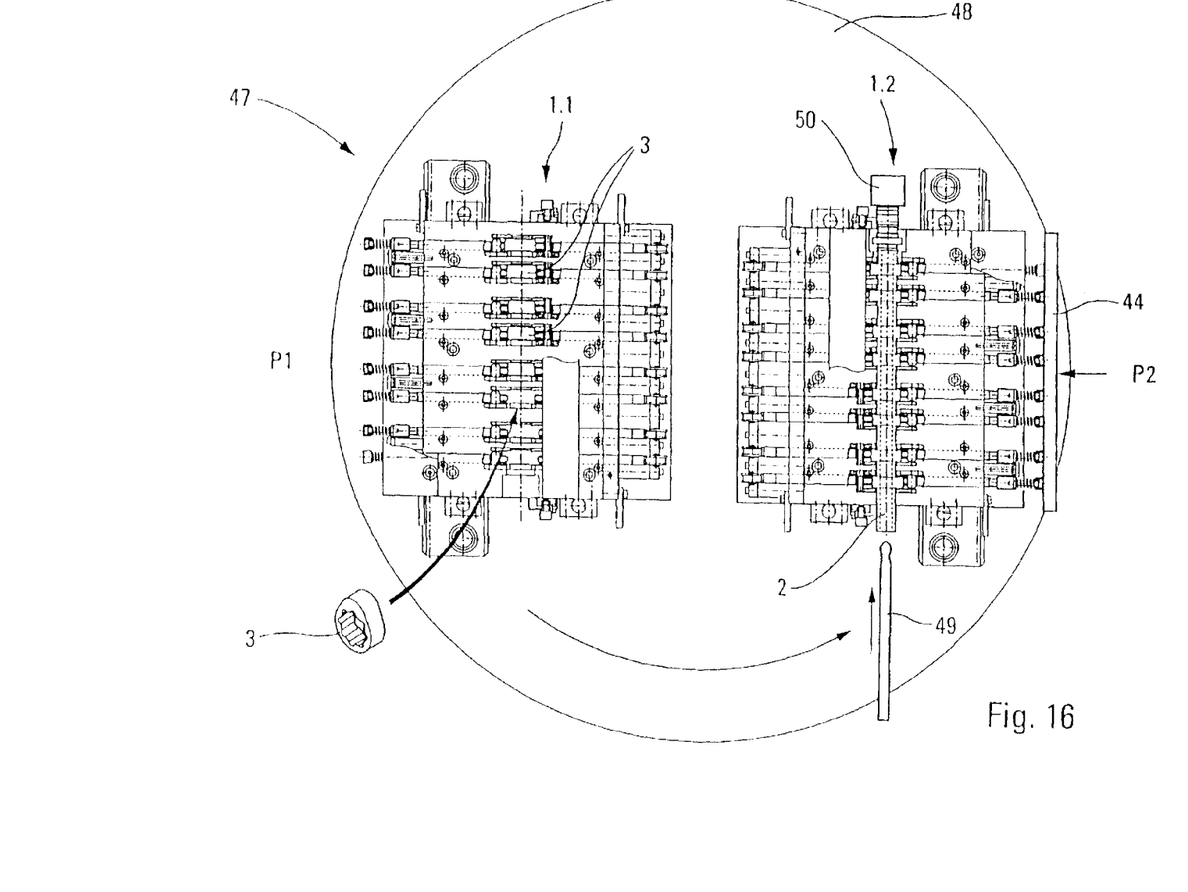
FIG. 16 is a schematic plan view of an expanding machine provided with two dies of FIGS. 1 to 3.

In the particular example of the camshaft illustrated in FIGS. 1 and 16, the cams 3 have been distributed in pairs, the axial distance between the two cams of a pair being smaller than the axial distance between two adjacent pairs.

Die 1 is provided with a base platen 7 provided with centering and/or fixation means 8. On base platen 7 there are mounted a plurality of segments 9, which are attached to one another. Segments 9 are interlocked with platen 7 by, for example, keys 10 (see FIG. 5), and are assembled together by tie rods 11 provided with end nuts 12. The assembly of segments 9 is closed at its ends by covers 13 and 14, of which one (13) can be a simple end plate, whereas the other (14) has a structure similar to that of segments 9 and hereinafter is considered as a segment 9. Covers 13 and 14 are also provided with centering and/or fixation means 15.

Each segment 9, which is a device for holding a cam 3 in orientation around a reference axis 16—the axis of the said cam 3 then coinciding with the said axis 16—is provided with a body 17 which has the form of a thick plate with parallel faces 18 and 19. In die 1, segments 9 are assembled in such a way that face 18 of one is applied against face 19 of another. As is evident from FIGS. 1 to 4, 6 and 7, certain segments 9 have a smaller thickness, in order to correspond to the axial distance between the two cams of a pair, while other segments 9 have a greater thickness, in order to correspond to the axial distance between two adjacent pairs of cams. More generally, the thickness of a segment 9 is determined by the position that cam 3 of the adjacent segment in die 1 must occupy along tubular axis 2.

In body 17 of each segment 9 there is made a transverse passage 20 centered on reference axis 16 and a radial conduit 21 for introduction of a cam 3. Introduction conduit 21 opens at one end into transverse passage 20 and at the other end at the upper periphery of body 17.

In die 1 there are provided as many segments 9—cover 14 of identical structure being counted as one segment 9—as there are cams 3 to be mounted on tubular axis 2, and the said segments are assembled one after another in such a way that their transverse passages 20 are aligned to form a channel 22 of axis 16, in order to receive the said tubular axis 2, and in such a way that their introduction conduits 21 are respectively disposed in correspondence with the position of a cam 3 along the said shaft.

In order to reduce the longitudinal space requirement of the die, each introduction conduit 21 is constituted on the one hand by an undercut 21A made in face 18 of the segment 9 in question and on the other hand by an undercut 21B made in face 19 of the adjacent segment 9 being applied against the said face 18.

In each introduction conduit 21 there are provided means 23 for holding a cam 3 in the said conduit in a waiting position in which its transverse orifice 5 is at least approximately coaxial with the corresponding transverse passage 20, or in other words with reference axis 16. Each means 23 of a segment 9 (see FIGS. 7, 8 and 9) is provided with a pressing pad 24, cut out at 25 in the extension of transverse passage 20 and seated in undercut 21B of the adjacent segment 9, as well as a reference plate 26, also cut out at 27 in the extension of transverse passage 20 and seated in undercut 21A of the corresponding segment 9, to which it is fixed. Pressing pad 24 is pressed elastically toward the associated reference plate 26 by springs 28, which flattens it against stops 29 when no cam 3 is in waiting position in holding means 23. Stops 29 impose between pressing pad 24 and reference plate 26 a minimum spacing e, which is smaller than the thickness E of a cam 3. It is therefore easily understood that, when a cam 3 is introduced flatly between the said pressing pad 24 and the said reference plate 26, the said pressing pad 24 is elastically spread apart from stops 29 and from the said reference plate 26 against the action of springs 28, and that the said cam is held by pressure between the pressing pad and the reference plate.

To facilitate the introduction of a cam 3 between pressing pad 24 and reference plate 26, the said pressing pad 24 is provided on its rim facing the inlet side of conduit 21 with a chamfer 30, on which the said cam 3, during the said introduction, exerts a pressure that by wedge effect causes the said pressing pad 24 to be spread apart elastically from reference plate 26.

Figure 5:
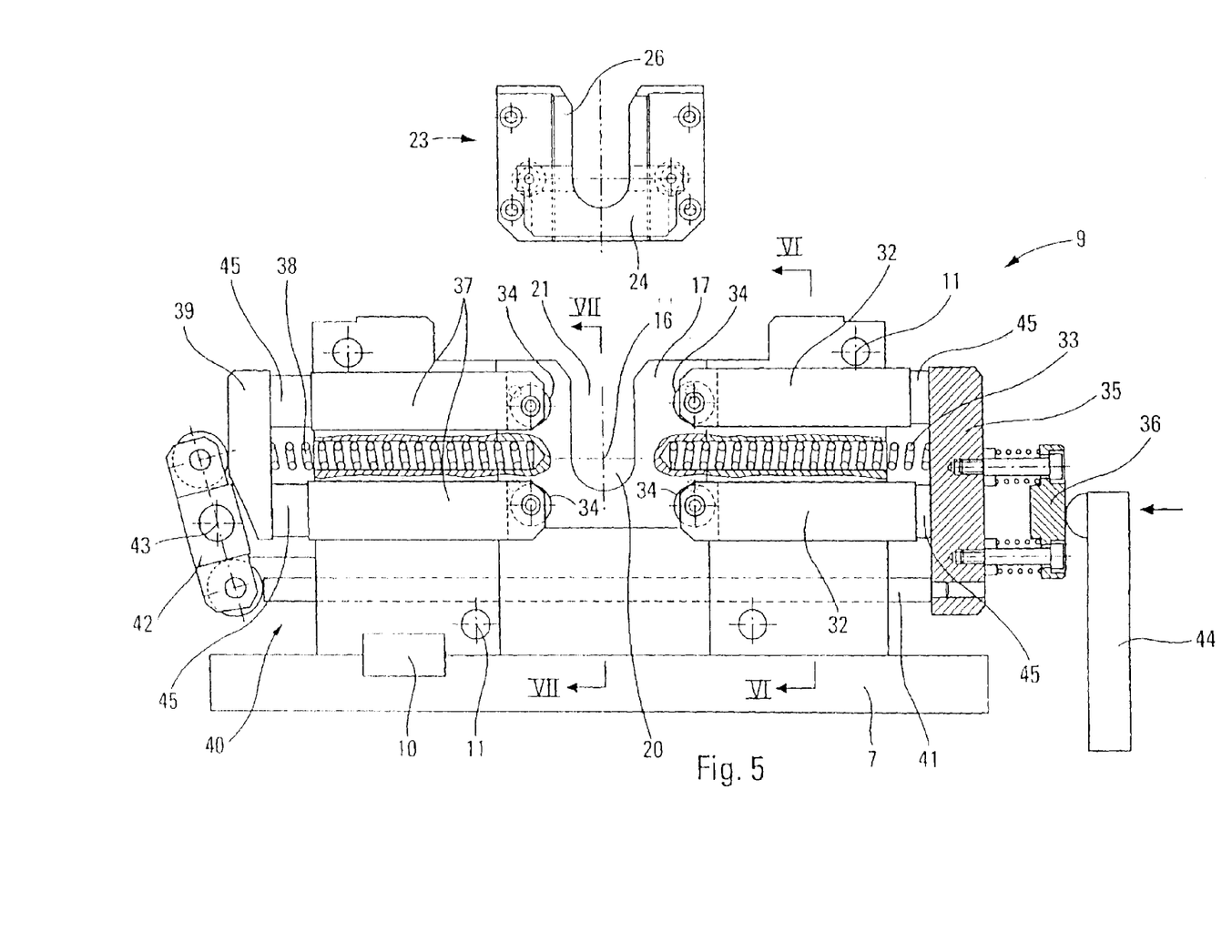
FIG. 5 is a schematic elevation view of the front of a segment of the die of FIGS. 1 to 3, illustrated with its cam-holding unit removed from the introduction conduit of the said segment.
Figure 8:
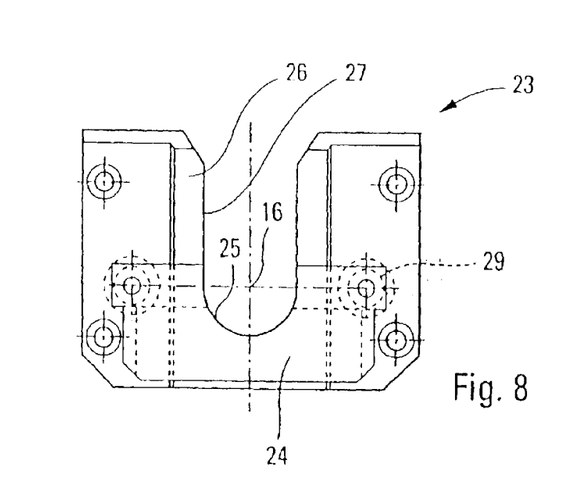
FIGS. 8 and 9 show respectively in front view and in partly cutaway overhead view a cam-holding unit for a segment of the expander die according to the present invention.
Figure 9:
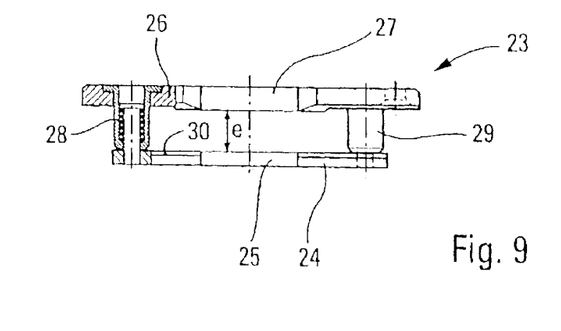

As illustrated by FIGS. 5, 8 and 9, the pressing pad 24, reference plate 26, springs 28 and stops 29 together form a unit 23 that can be introduced and fixed in an introduction conduit 21.

Figure 6:
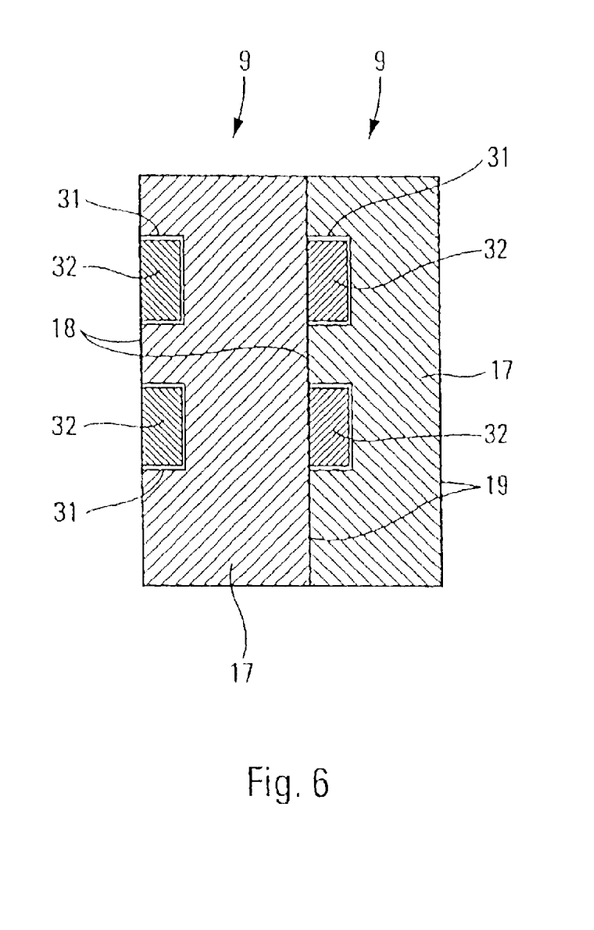
FIGS. 6 and 7 schematically show, in section along lines VI-VI and VII-VII respectively of FIG. 5, the assembly of a thicker segment and of a less thick segment, the said segments being illustrated in FIG. 7 with their cam-holding units loaded respectively with such a cam.
Figure 7:
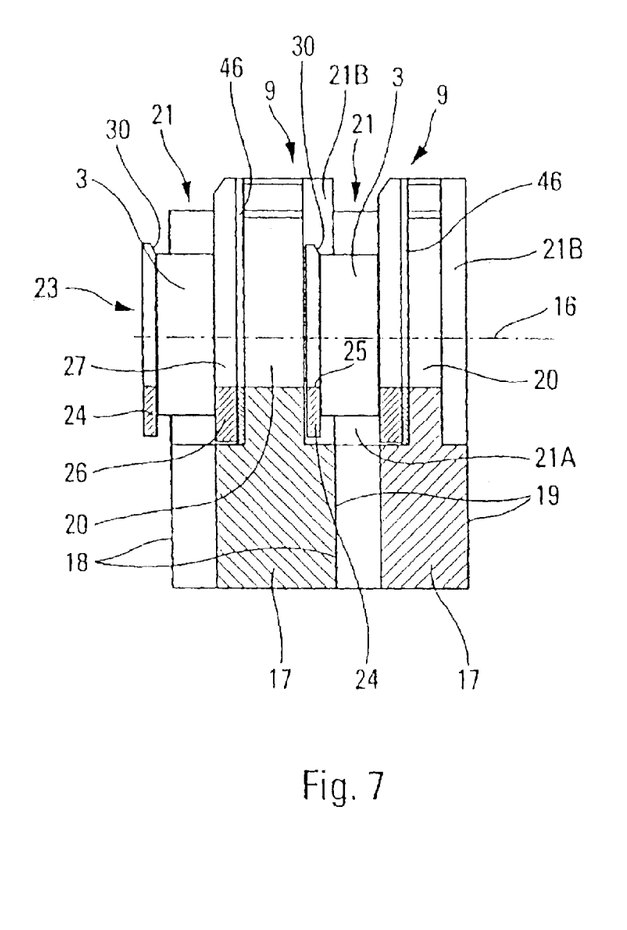

In addition, as is particularly evident in FIGS. 5 and 6, straight slideways 31 are machined in face 18 of segments 9 and of cover 14 for:

two first straight sliding blocks 32, spaced apart and parallel, disposed on one side of transverse passage 20 and mounted in the corresponding slideways 31 in such a way that they can slide translationally relative to body 17 in a direction substantially orthogonal to the said transverse passage 20. First sliding blocks 32 are elastically spread apart from transverse passage 20 by a spring 33 braced against the said body 17. The internal ends of the two sliding blocks 32, directed toward transverse passage 20, are equipped with roller wheels 34. The external ends of the two sliding blocks 32 project outside body 17 and are translationally interlocked with one another by a push bar 35 carrying a spring cushioning element 36; and two second straight sliding blocks 37, spaced apart and mutually parallel in the same way as first sliding blocks 32, disposed in mirror-image relationship to the latter on the other side of transverse passage 20 and mounted in their corresponding slideways 31 in such a way that they can slide translationally relative to the said body 17 in a direction substantially orthogonal to transverse passage 20. Second sliding blocks 37 are elastically spread apart from transverse passage 20 by a spring 38 braced against the said body 17. The internal ends of the two sliding blocks 37, directed toward transverse passage 20, are equipped with roller wheels 34. The external ends of the two sliding blocks 37 project outside body 17 and are translationally interlocked with one another by a cam bar 39.

In addition, a mechanical linkage 40 connects the two first sliding blocks 32 with the two second sliding blocks 37. This mechanical linkage is provided with a push rod 41, connected at one of its ends to the said push bar 35 and at its opposite end to one of the ends of a bell-crank lever 42, mounted to pivot around an intermediate fixed pin 43 carried by body 17. The other end of bell-crank lever 42 is braced against cam bar 39. Thus, when an actuating member 44 presses push bar 35 via cushioning element 36, first sliding blocks 32 are pressed against the elastic action of spring 33 in such a way that their wheels 34 provided at their internal ends are displaced toward introduction conduit 21. The same effect takes place symmetrically for wheels 34 provided at the internal ends of second sliding blocks 37, by virtue of the action that push rod 41 and bell-crank lever 42 exert via cam bar 39 on spring 38. Conversely, when the action of actuating member 44 on bar 35 ceases, springs 33 and 38 elastically push the said first and second sliding blocks back and spread them apart from introduction conduit 21. Stops (not illustrated) are provided to limit the return travel of the said sliding blocks under the relaxation action of springs 33 and 38.

The length of each of the sliding blocks 32 and 37 can be adjusted by, for example, interchangeable shims 45 disposed respectively between push bar 35 and the external ends of first sliding blocks 32 and between cam bar 39 and the external ends of second sliding blocks 37. Shims 45 can be interlocked with the external ends of the said sliding blocks 32 and 37 and/or of bars 35 and 39 by joints of the mortise and tenon type, for example (not illustrated).

Figure 10:
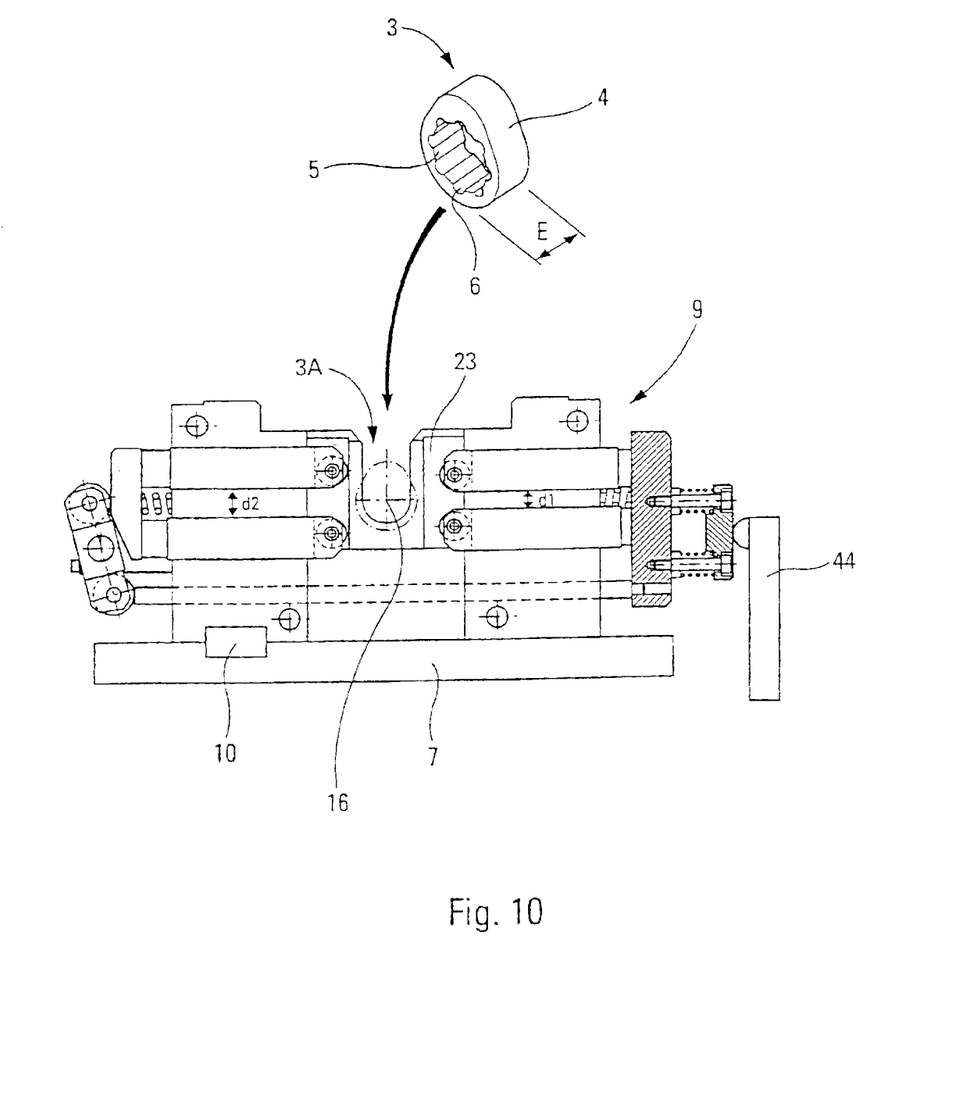
FIG. 10 illustrates in front view a segment of the expander die provided with its. cam-holding unit in introduction position of such a cam.

In addition, in segments 9, the spacing d1 between the first sliding blocks 32 and/or the spacing d2 between the second sliding blocks can be different from one segment 9 to another (FIG. 10).

Figure 12:
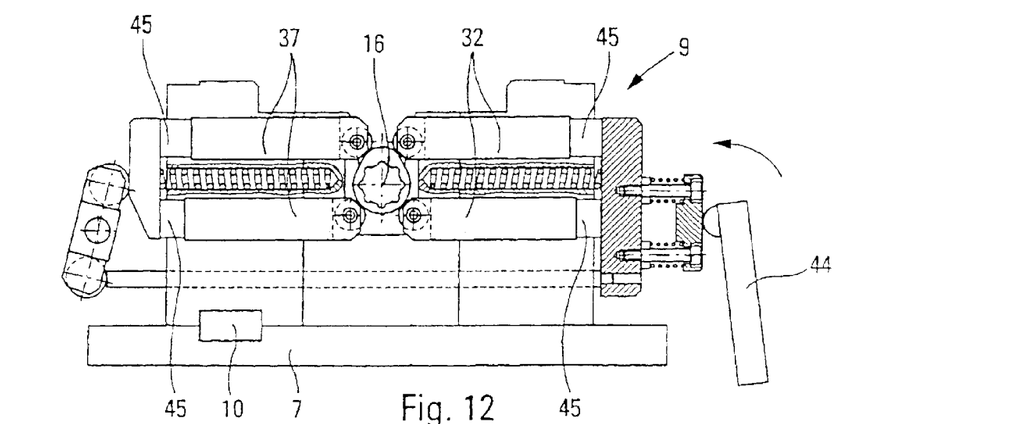
FIGS. 12, 13 and 14 illustrate in schematic front views the centering and angular orientation of the cam of FIG. 11 for three different values respectively of the said angular orientation.
Figure 13:
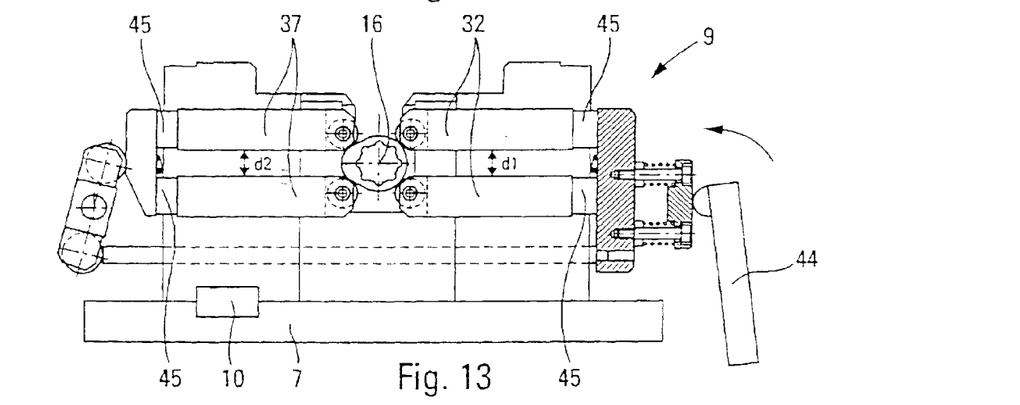
Figure 14:
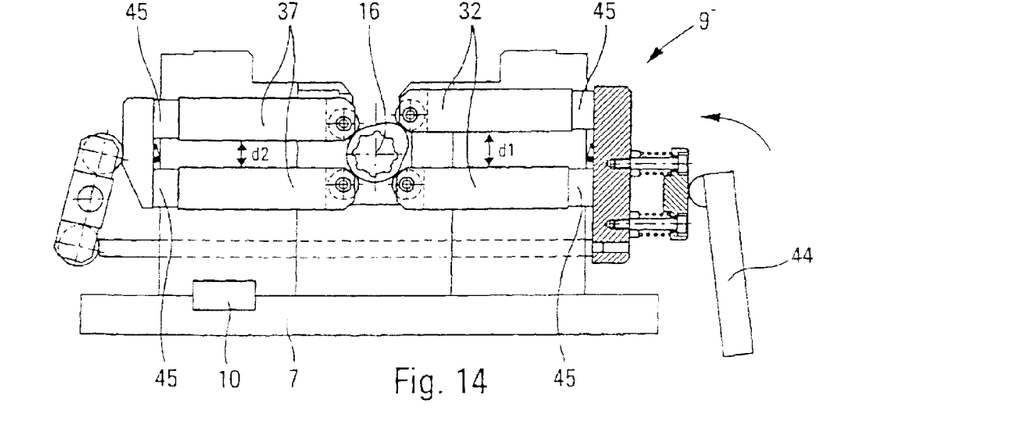
Figure 15:
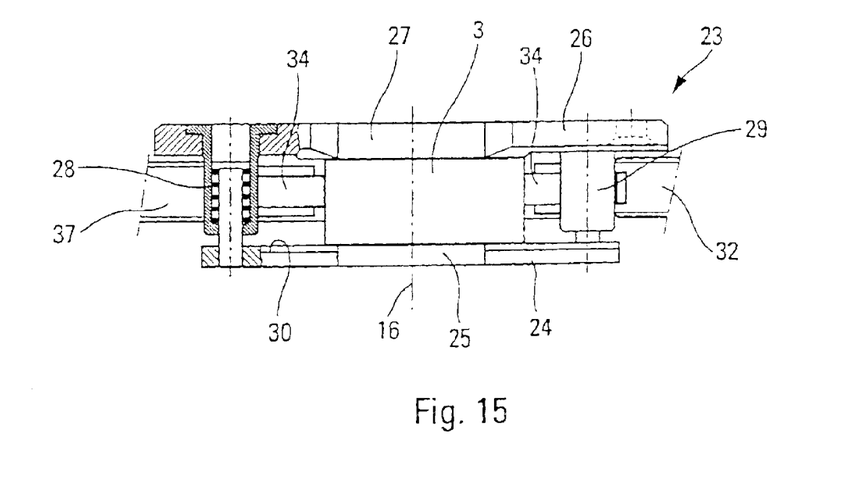
FIG. 15 is an overhead view of the cam-holding unit of the segment of FIG. 10 after centering and angular orientation of the cam of FIG. 11, in the case of FIG. 14.

Thus, as illustrated by FIGS. 12 to 14, there is associated, with a cam 3 that must occupy a given angular position around reference axis 16, a segment 9 whose spacings d1 and/or d2 are most suitable for engagement with the said cam. Then, by means of interchangeable shims 45, the length of the said sliding blocks 32 and 37 is adjusted to the value that is optimal for holding cam 3 in this given angular position. In each case, the choice of a segment 9 with its particular spacing d1 and d2 is determined by calculation, while adjustment of the length of each of sliding blocks 32 and 37 with specific shims 45 is achieved by measurements using standard cams, identical to the said cams 3 and disposed in the angular positions desired for the said cams 3. FIGS. 12, 13 and 14 illustrate three examples of adjustments with different spacings d1 and/or d2 and different shims 45, these three examples corresponding respectively, for cams 3, to a vertical position pointing up, to a horizontal position pointing left and to a 45° position pointing up and right.

It will be further noted that the axial position of each cam 3 along tubular shaft 2 can be adjusted—also by tests—by a shim of thickness 46 (see FIG. 7) disposed, for example, between reference plate 27 of means 23 and body 17 of the corresponding segment 9.

Thus, once the different choices of d1, d2 and the different adjustments have been made in die 1 by means of shims 45 and 46, cams 3 can now be loaded.

Figure 11:
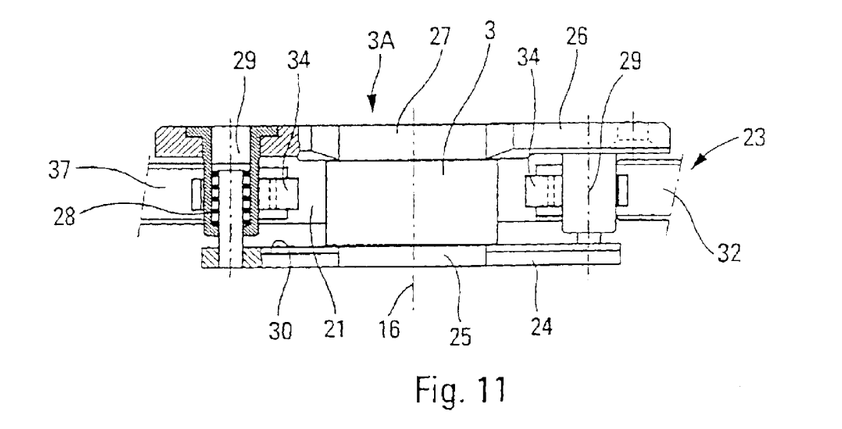
FIG. 11 is an overhead view of the cam-holding unit of the segment of FIG. 10 just after introduction of such a cam between its pressing pad and its reference plate.

Each cam 3, which is carried, for example, by the arm of a robot (not illustrated), is brought above the corresponding introduction conduit 21 in such a way that it partly overhangs chamfer 30 of pressing pad 24 in question. The robot lowers the said cam 3 which, while being braced against the said chamfer 30, pushes pressing pad 24 back against the action of springs 28 and spreads it apart from reference plate 26. Cam 3 can therefore be inserted flatly between the said pressing pad 24 and reference plate 26, which press it elastically between them. The robot then brings the said cam 3 into a waiting position 3A, in which its orifice 5 is at least approximately coaxial with reference axis 16. Such a waiting position 3A, in which the said cam 3 is held by friction, is illustrated in FIGS. 10 and 11.

After all cams 3 have been loaded into die 1—each then being disposed in its waiting position—actuating member 44, which is common to all segments 9 of this die, acts on all of the push bars 35, in such a way that wheels 34 of sliding blocks 32 and wheels 34 of sliding blocks 37 are displaced toward the portion facing the ovoid contour 4 of cams 3, until contact with the said contour is made. Wheels 34 of sliding blocks 32 and 37 therefore exert on cams 3 forces and/or torques that adjust the centering and angular orientation of the said cams 3, in correspondence with the chosen spacings d1, d2 and the thickness of interposed shims 45. In this way, all cams 3 are then centered on reference axis 16, with the position and angular orientation desired for the camshaft (see FIGS. 12 to 15).

After introduction of the said tubular shaft 2 through all of the said cams held in die 1—either before or after these cams have been blocked in position—the said tubular shaft 2 can be expanded—after the said cams 3 have been blocked in position—in order to interlock the said cams 3 and the said shaft 2.

To discharge camshaft 2, 3 produced in this way, actuating member 44 is commanded to release the pressure that it is exerting on push bars 35. Springs 33 and 38 then push sliding blocks 32 and 37 back in such a way that camshaft 2, 3 can be removed from die 1.

FIG. 16 schematically shows a machine 47 for production of expanded camshafts according to the invention by using two dies 1 of the invention, denoted respectively by 1.1 and 1.2. These dies 1.1 and 1.2 are carried by a movable support 48, for example of rotary type, which is capable of moving each die from a first working station P1 to a second working station P2, then from this back to the first working station P1, one of the dies 1.1 (or 1.2) being disposed at the first working station P1 while the other 1.2 (or 1.1) is disposed at the second working station P2 and vice versa.

At the first working station P1, each die is loaded with cams 3 in the way described hereinabove. At the second working station P2 there is provided the said common actuating member 44, which ensures correct centering and angular orientation of cams 3. At this station it is therefore possible to introduce tubular shaft 2 into cams 3 of the said dies, then to expand the said shaft 2 by means of an expander 49, the said shaft then being against a stop 50—for example of retractable type—provided at the second station P2.

What is claimed is:

1. A device for holding in orientation, around a reference axis, a flat cam with an ovoid peripheral contour perforated by an orifice through which a tubular shaft can be passed, an axis of the tubular shaft coinciding with the reference axis, in view of fixation of the cam on the shaft by expanding the shaft, comprising:

a body provided with a transverse passage for the shaft and with an introduction conduit for introduction of the cam, the introduction conduit opening at a first end into the transverse passage and at a second end at a periphery of the body;

means for holding the cam in the introduction conduit in a waiting position in which the orifice is at least approximately coaxial with the transverse passage;

two first sliding blocks, spaced apart and parallel, interlockingly mounted to move translationally in the body in a manner that is at least substantially orthogonal to the transverse passage for the shaft, the first sliding blocks being elastically spread apart from the transverse passage by first elastic means, with their external ends projecting outside the body on a first side of the body and their internal ends disposed facing a part of the ovoid peripheral contour of the cam when the cam is in a waiting position;

two second sliding blocks, spaced apart and parallel, in mirror-image relationship to the first sliding blocks and interlockingly mounted to move translationally in the body, in a manner that is at least substantially orthogonal to the transverse passage for the shaft, the second sliding blocks being elastically spread apart from the transverse passage by second elastic means, with their external ends projecting outside the body on a second side of the body, and their internal ends disposed facing another part of the ovoid peripheral contour of the cam when the cam is in the waiting position; and a mechanical linkage connecting the first and second sliding blocks such that, when the first sliding blocks are pressed against action of the first elastic means to displace the internal ends of the first sliding blocks toward a part of the ovoid peripheral contour of the cam until contact is made therewith, the second sliding blocks are pressed by the mechanical linkage against action of the second elastic means to displace the internal ends of the second sliding blocks toward a second part of the ovoid peripheral contour of the cam until contact is made therewith.

2. A device according to claim 1, wherein lengths of each of the first and second sliding blocks are determined by the ovoid peripheral contour of the cam and by an angular orientation of the cam around the shaft.

3. A device according to claim 2, wherein the first and second sliding blocks are adjustable in length.

4. A device according to claim 1, wherein the spacing between the first sliding blocks and the spacing between the second sliding blocks are determined by the ovoid peripheral contour of the cam and by an angular orientation of the cam around the shaft.

5. A device according to claim 1, wherein the internal ends of the first and second sliding blocks are provided with rolling members for contact with the ovoid peripheral contour of the cam.

6. A device according to claim 1, wherein the means for holding the cam in the waiting position in the introduction conduit comprises a pressing pad pressed elastically toward a reference plate interlocked with the device, the pressing pad being spread apart elastically from the reference plate during introduction of the cam flatly between the pressing pad and the reference plate.

7. A device according to claim 6, wherein the means for holding the cam further comprises a stop system against which the pressing pad is pressed elastically when no cam is in the waiting position, the stop system imposing, between the pressing pad and the reference plate, a minimum spacing smaller than a thickness of the cam.

8. A device according to claim 6, wherein the pressing pad includes a chamfer on which the cam, during displacement toward the waiting position in the introduction conduit, exerts a pressure that causes the pressing pad to be spread apart elastically relative to the reference plate.

9. A device according to claim 6, wherein the means for holding the cam forms a mechanical unit inserted and fixed in the introduction conduit.

10. A device according to claim 1, wherein the body has a form of a thick plate with parallel first and second faces.

11. A device according to claim 10, wherein slideways for the first and second sliding blocks are machined in the first parallel face of the plate, while the introduction conduit is machined only partly in the first face, the second face of the plate being machined to form partly the introduction conduit of another plate, whose first face is configured to be applied against the second face of the plate.

12. A die for production, by expanding, of a tubular camshaft, cams being distributed along the shaft with specific orientations, provided with as many devices according to claim 1 as the shaft has cams, the devices being assembled one after another such that their transverse passages are aligned to form a channel for the tubular shaft and such that their cam introduction conduits are disposed respectively at a position of a cam along the shaft.

13. A die according to claim 12, wherein for each device each respective body has a form of a thick plate with parallel first and second faces, and wherein a thickness of each thick plate constituting each body of each device is determined by positions to be occupied by the cams along the shaft.

14. A die according to claim 13, wherein the bodies of all of the devices have identical thickness, and wherein thickness shims configured to be interposed between the devices are provided to ensure correct correspondence with positions to be occupied by the cams along the shaft.

15. A machine for production, by expanding, of a tubular camshaft, in which cams are distributed along a shaft with specific orientations, provided with at least one die according to claim 12 and with a single actuating member for commonly pressing all of the first sliding blocks of the die, the actuating member being mounted on the machine independently of the die.

16. A machine according to claim 15, provided with a stop for blocking, during an expanding operation, one end of the tubular shaft passing through the cams, the stop being mounted on the machine, independently of the die, facing the channel for the tubular shaft.

17. A machine according to claim 15, equipped with at least two dies, each able to move from at least one cam-loading station to at least one expanding station then, after discharge of the expanded camshaft, from the expanding station to the loading station.

* * * * *